US012038573B2

(12) United States Patent
Baek et al.

(10) Patent No.: US 12,038,573 B2
(45) Date of Patent: Jul. 16, 2024

(54) AUTONOMOUS DRIVING APPARATUS (71) Applicant: LG ELECTRONICS INC., Seoul (KR)

(72) Inventors: Seungmin Baek, Seoul (KR); Haemin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 943 days.

(21) Appl. No.: 16/963,206

(22) PCT Filed: May 2, 2019

(86) PCT No.: PCT/KR2019/005266
§ 371 (c)(1),
(2) Date: Jul. 17, 2020

(87) PCT Pub. No.: WO2020/222336
PCT Pub. Date: Nov. 5, 2020

(65) Prior Publication Data
US 2021/0373320 A1 Dec. 2, 2021

(51) Int. Cl.
*G01S 7/481* (2006.01)
*B60L 50/60* (2019.01)
*B60R 1/12* (2006.01)
*G01S 17/931* (2020.01)
*G02B 26/08* (2006.01)
*G02B 26/10* (2006.01)

(52) U.S. Cl.
CPC .......... *G02B 26/0816* (2013.01); *B60L 50/60* (2019.02); *B60R 1/12* (2013.01); *G01S 7/4817* (2013.01); *G01S 17/931* (2020.01); *G02B 26/10* (2013.01); *B60R 2001/1223* (2013.01)

(58) Field of Classification Search
CPC ...... G01S 7/4817; G01S 17/931; G02B 26/10
See application file for complete search history.

(56) References Cited

U.S. PATENT DOCUMENTS 10,088,557 B2  10/2018 Yuen
2018/0011173 A1* 1/2018 Newman ............... B60S 1/0818
(Continued)

FOREIGN PATENT DOCUMENTS

CN  106546225  3/2017
KR  20160078043  7/2016
(Continued)

OTHER PUBLICATIONS

Machine translation of KR20160078043A (Year: 2016).*
(Continued)

*Primary Examiner* — Yuqing Xiao
*Assistant Examiner* — Zhengqing Qi
(74) *Attorney, Agent, or Firm* — LEE, HONG, DEGERMAN, KANG & WAIMEY (57) ABSTRACT An autonomous driving apparatus according to an exemplary embodiment of the present invention may include a drive unit configured to provide a driving function, a body unit coupled at an upper side of the drive unit, a lidar device coupled to the drive unit, a lidar device groove having an opening portion formed in the irradiation direction of the lidar device, and a mirror module coupled inside the lidar device groove in the irradiation direction of the lidar device.

16 Claims, 12 Drawing Sheets

(56) References Cited

U.S. PATENT DOCUMENTS

| | | | |
|---|---|---|---|
| 2018/0172804 A1 | 6/2018 | Gassend et al. | |
| 2018/0178390 A1 | 6/2018 | Yang et al. | |
| 2018/0284228 A1* | 10/2018 | LaChapelle | G01S 17/42 |
| 2020/0116831 A1* | 4/2020 | Spiessberger | H01Q 3/14 |

FOREIGN PATENT DOCUMENTS

| | | | |
|---|---|---|---|
| KR | 20160078043 A * | 7/2016 | |
| KR | 20160113794 | 10/2016 | |
| KR | 20170078031 | 7/2017 | |
| KR | 20180074509 | 7/2018 | |
| RU | 2402795 C1 * | 10/2010 | |
| WO | 2018077291 | 5/2018 | |

OTHER PUBLICATIONS

Machine translation of RU2402795C1 (Year: 2010).*
Anthony Wood, "Testing the world's blackest material in orbit" accessed from "www.newatlas.com/vantablack-kent-ridge-1-satellite/43340/" publishing date May 16, 2016. (Year: 2016).*
Newport, "Multi-Axis Tilt Platforms" accessed from "www.newport.com/f/multi-axis-tilt-platforms" with WayBack Machine dated Oct. 12, 2018. (Year: 2018).*
Korean Intellectual Property Office Application No. 10-2019-7024379 Office Action dated Mar. 7, 2024, 6 pages.

* cited by examiner

AUTONOMOUS DRIVING APPARATUS

CROSS-REFERENCE TO RELATED APPLICATIONS

This application is the National Stage filing under 35 U.S.C. 371 of International Application No. PCT/KR2019/005266, filed on May 2, 2019, the contents of which are all hereby incorporated by reference herein in their entirety.

TECHNICAL FIELD

The present invention relates to an autonomous driving apparatus.

BACKGROUND ART

An autonomous driving apparatus is an apparatus that may autonomously move and avoid obstacles without being driven directly by a driver. Representative examples of the autonomous driving apparatus include an autonomous driving vehicle, an autonomous driving robot, an autonomous driving drone, a smart wheelchair, and the like.

In general, the autonomous driving apparatus may include a light detection and ranging (lidar) device to detect a traveling route, an obstacle, and the like.

The lidar device is a device configured to precisely derive a surrounding appearance by emitting pulsed laser beams, receiving the laser beams returning after being reflected by a surrounding target object, and then measuring a distance or the like to the object.

In this regard, the information of documents in the related art is as follows.

1. Korean Patent Application Laid-Open No. 10-2018-0074509 (Published on Jul. 3, 2018)

Title of the Invention: Cleaning Robot

However, the autonomous driving apparatus in the related art has the following problems.

Because a lidar device is installed in a depressed portion formed in a cover, some of the upwardly or downwardly directed pulsed laser beams emitted from the lidar device are emitted to the cover.

For this reason, the lidar device sometimes cannot detect an obstacle positioned in the direction toward the ground surface adjacent to the autonomous driving apparatus.

Figure 1:
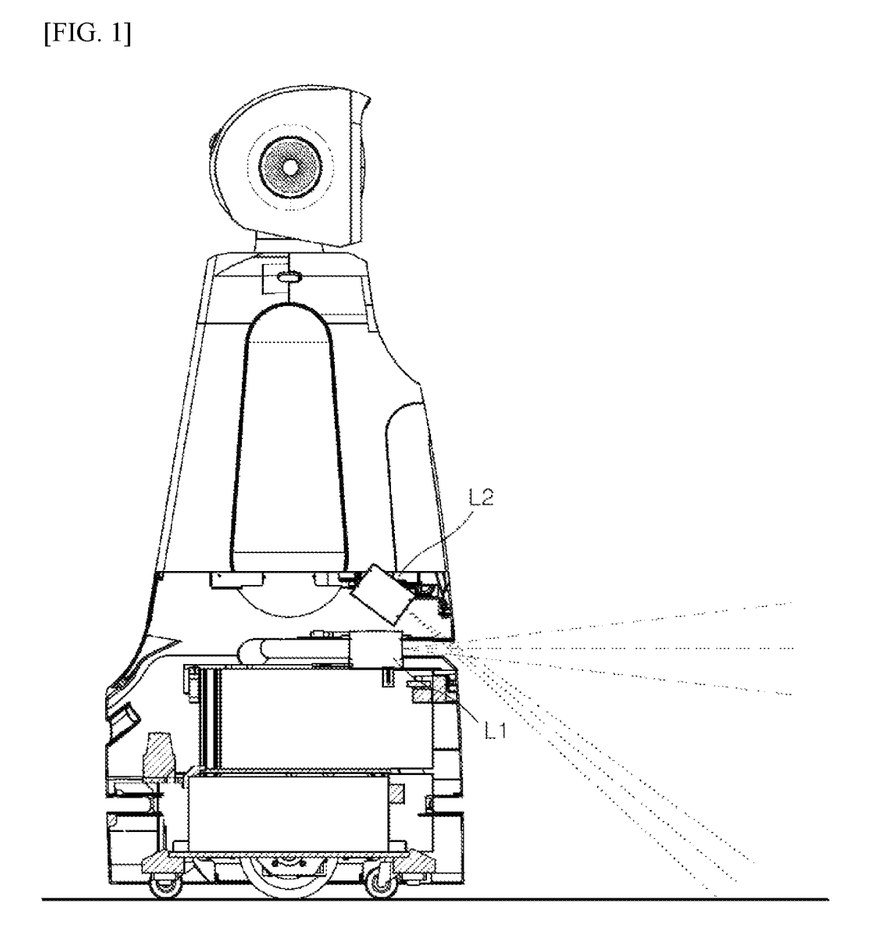
FIG. 1 is a cross-sectional side view of an autonomous driving apparatus including both a horizontal lidar device and a cliff lidar device in the related art.

In order to solve this problem, as illustrated in FIG. 1, the improved autonomous driving apparatus may include both a horizontal lidar device L1 configured to emit laser beams in the horizontal direction and a cliff lidar device L2 configured to emit laser beams in the direction toward the ground surface adjacent to the autonomous driving apparatus.

Therefore, the improved autonomous driving apparatus may detect an obstacle positioned in the direction toward the ground surface adjacent to the autonomous driving apparatus by means of the cliff lidar device L2.

However, because the improved autonomous driving apparatus is additionally provided with the comparatively high-priced lidar device, there is a problem in that costs required to manufacture the autonomous driving apparatus are increased.

In addition, there is a problem in that a degree of design freedom of the improved autonomous driving apparatus deteriorates due to a power source, signal wires, mechanical fixing structure, and the like used for the two lidar devices installed adjacent to each other.

DISCLOSURE

Technical Problem

The present invention has been made in an effort to solve the above-mentioned problems, and an object of the present invention is to provide an autonomous driving apparatus configured to minimize a restriction on a detection region of a lidar device caused by a mechanical structure formed in an irradiation range of the lidar device.

In addition, another object of the present invention is to provide an autonomous driving apparatus capable of simultaneously detecting, by using a single lidar device, a horizontal direction and a downward or upward direction adjacent to the autonomous driving apparatus.

In addition, still another object of the present invention is to provide an autonomous driving apparatus capable of improving economic feasibility and a degree of design freedom by minimizing the number of lidar devices to be mounted.

Technical Solution

In order to achieve the above-mentioned objects, according to an autonomous driving apparatus according to an exemplary embodiment of the present invention, a mirror module is coupled inside a lidar device groove in an irradiation direction of a lidar device.

Specifically, the mirror module coupled inside the lidar device groove in the irradiation direction of the lidar device reflects some laser beams emitted from the lidar device, thereby expanding a detection region of the lidar device.

The autonomous driving apparatus includes a drive unit configured to provide a driving function, a body unit coupled at an upper side of the drive unit, a lidar device coupled to the drive unit, a lidar device groove having an opening portion formed in the irradiation direction of the lidar device, and a mirror module coupled inside the lidar device groove in the irradiation direction of the lidar device.

In addition, the lidar device groove may be formed between an upper surface of the drive unit and a bottom surface of the body unit.

In addition, the mirror module is coupled, in a recessed manner, at an inner upper end of the lidar device groove and configured to reflect, toward a front lower side of the lidar device, the laser beams emitted from the lidar device.

In addition, the mirror module is coupled, in a recessed manner, at an inner lower end of the lidar device groove and configured to reflect, toward a front upper side of the lidar device, the laser beams emitted from the lidar device.

In addition, the mirror module of the autonomous driving apparatus according to the exemplary embodiment of the present invention includes a mirror panel configured to rotate about a mirror panel rotating shaft.

Specifically, the mirror module may reflect, toward a region to be detected, the laser beams emitted from the lidar device by adjusting a gradient of the mirror panel.

In addition, the mirror module may further include a control unit configured to set a gradient of the mirror panel, and a mirror module drive unit configured to rotate the mirror panel.

In addition, the mirror module includes a gradient sensor to maintain a predetermined gradient of the mirror panel.

In addition, the gradient of the mirror panel of the mirror module is changed in accordance with a traveling speed of the drive unit.

In addition, the mirror module of the autonomous driving apparatus according to the exemplary embodiment of the present invention includes a compensation filter configured to compensate for the laser beams reflected by the mirror panel and having noise.

More specifically, the compensation filter may rotate about a compensation filter rotating shaft so as to have a gradient set by the control unit.

In addition, the mirror panel rotating shaft is a spherical joint and may include the compensation filter configured to rotate about the compensation filter rotating shaft coupled at one side of the mirror panel.

Advantageous Effects

The autonomous driving apparatus according to the present invention may minimize the restriction on the detection region of the lidar device caused by a mechanical structure or a constituent component.

In addition, there is an advantage of simultaneously detecting, by using the single lidar device, the horizontal direction and the downward or upward direction adjacent to the autonomous driving apparatus.

In addition, there is an advantage of minimizing the number of lidar devices to be mounted. Therefore, it is possible to reduce a manufacturing cost and a weight.

In addition, there is an advantage of improving a degree of design freedom by simplifying a power source, signal wires, and a mechanical fixing structure used for the lidar device.

DESCRIPTION OF MAIN REFERENCE NUMERALS OF DRAWINGS

100: Drive unit
110: Lidar device
110a: Horizontal laser beam
110b: Upwardly directed laser beam
110c: Reflected laser beam
120: Wheel
130: Battery
140: Detecting sensor
200: Body unit
210: Lidar device groove
220: Mirror module
220a: Mirror module seating portion
221: Mirror panel rotating shaft
222: Mirror panel
222a: Mirror panel normal line
223: Compensation filter rotating shaft
224: Compensation filter

BEST MODE

Hereinafter, some exemplary embodiments of the present invention will be described in detail with reference to the illustrative drawings. In denoting reference numerals to constituent elements of the respective drawings, it should be noted that the same constituent elements will be designated by the same reference numerals, if possible, even though the constituent elements are illustrated in different drawings. Further, in the following description of the exemplary embodiments of the present invention, a detailed description of publicly known configurations or functions incorporated herein will be omitted when it is determined that the detailed description obscures the subject matters of the exemplary embodiments of the present invention.

In addition, the terms first, second, A, B, (a), and (b) may be used to describe constituent elements of the exemplary embodiments of the present invention. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" between the constituent elements.

Also this work was supported by the ICT R&D program of MSIT/IITP[2017-0-00306, Development of Multimodal Sensor-based Intelligent Systems for Outdoor Surveillance Robots.

Figure 2:
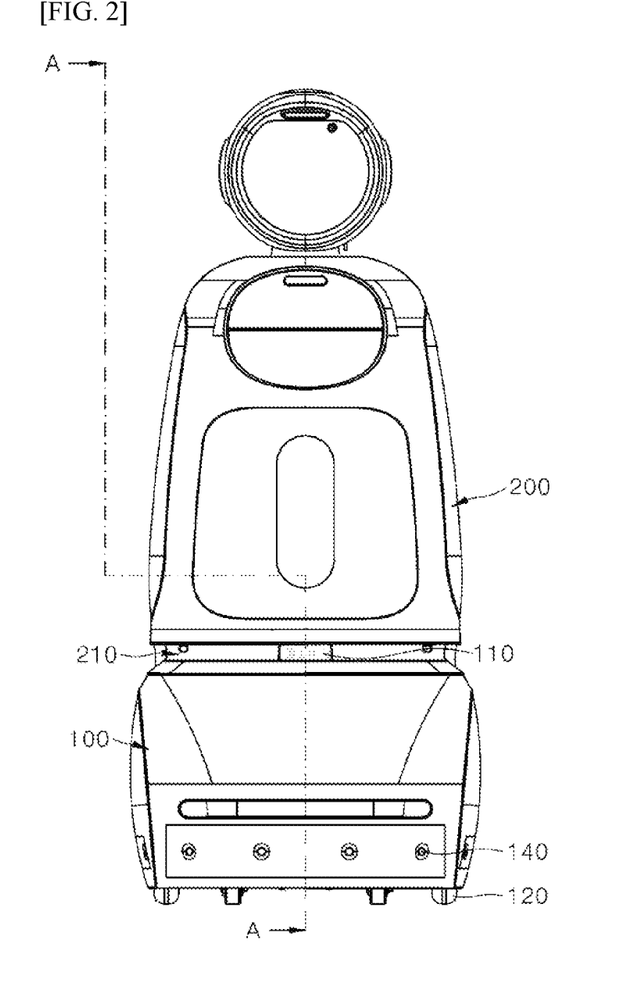
FIG. 2 is a front view of an autonomous driving apparatus according to a first exemplary embodiment of the present invention.

FIG. 2 is a front view of an autonomous driving apparatus according to a first exemplary embodiment of the present invention.

Figure 3:
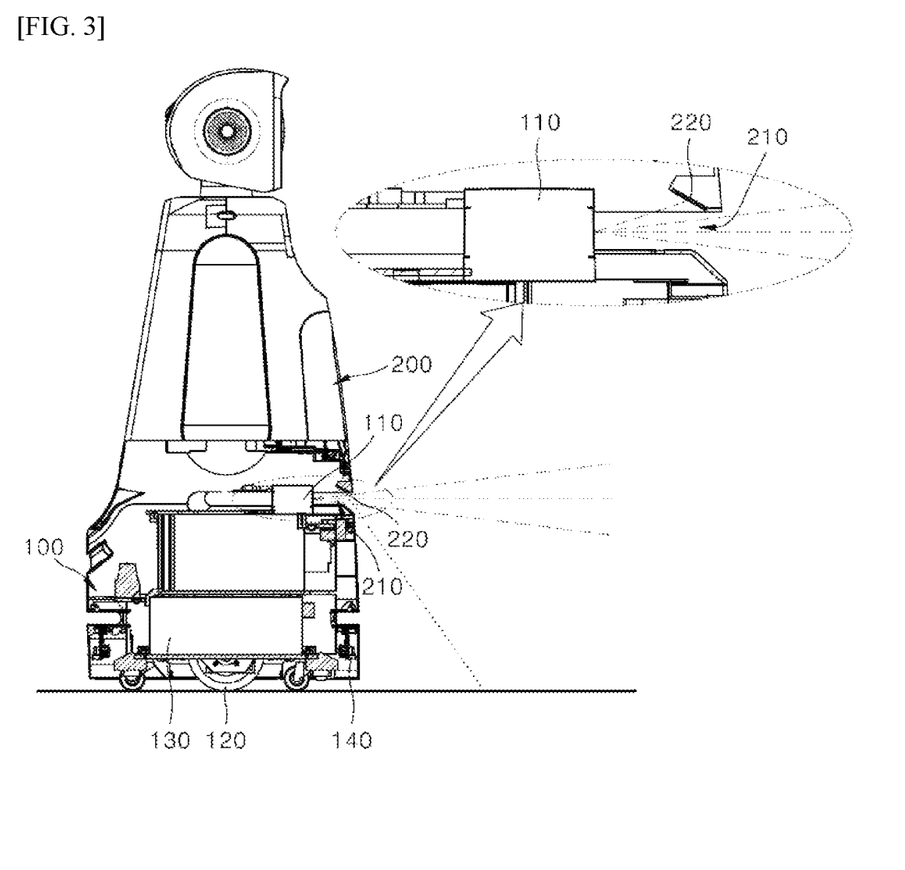
FIG. 3 is a cross-sectional side view of the autonomous driving apparatus according to the first exemplary embodiment of the present invention.

FIG. 3 is a cross-sectional side view of the autonomous driving apparatus according to the first exemplary embodiment of the present invention.

Referring to FIGS. 2 and 3, the autonomous driving apparatus according to the exemplary embodiment of the present invention may include a drive unit 100 configured to provide a driving function, a body unit 200 coupled at an upper side of the drive unit 100, a lidar device 110 coupled to the drive unit 100, a lidar device groove 210 having an opening portion formed in an irradiation direction of the lidar device 110, and a mirror module 220 coupled inside the lidar device groove 210 in the irradiation direction of the lidar device 110.

In addition, the drive unit 100 includes therein one or more pairs of wheels 120 configured to be operated by a battery 130.

Specifically, the wheels 120 may include a pair of main wheels connected to a motor (not illustrated) and configured to rotate along with an operation of the motor, and auxiliary wheels configured to move depending on the movement of the main wheels or be rotated by an external force without being connected to a separate drive device. In addition, the drive unit 100 may include multiple detecting sensors 140 disposed in a direction in which the lidar device groove 210 is formed.

More particularly, the detecting sensor 140 may be formed at a lower side of the lidar device groove 210 and may be an ultrasonic sensor capable of detecting a distance between the drive unit 100 and an obstacle by using an ultrasonic signal.

In addition, the lidar device 110 may be a multichannel lidar device having a vertical irradiation range of 40° or more.

In addition, a surface treatment may be performed on or a shield tape or the like may be attached to an upper surface and a bottom surface of the lidar device groove 210 to prevent laser beams emitted from the lidar device 110 from being reflected.

The mirror module 220 is coupled to an inner upper end of the lidar device groove 210 and reflects, toward a front lower side of the lidar device 110, the laser beams emitted from the lidar device 110.

In addition, the mirror module 220 may be coupled in a recessed manner so as not to block the laser beams emitted through the opening portion of the lidar device groove 210.

As illustrated in FIG. 3, some of the upwardly directed laser beams emitted from the lidar device 110 are reflected by the mirror module 220 and travel toward the ground surface adjacent to the autonomous driving apparatus.

Therefore, the autonomous driving apparatus according to the present invention may increase the irradiation range of the lidar device 110.

In addition, there is an effect of increasing a region detected by the lidar device 110.

Meanwhile, because the lidar device 110 is comparatively expensive and a detection performance considerably deteriorates if foreign substances or the like are attached to the lidar device 110. Therefore, it is necessary to minimize exposure of the lidar device 110 to the outside.

Therefore, the lidar device groove 210 may be formed between an upper surface of the drive unit 100 and a bottom surface of the body unit 200.

In addition, in order to prevent the reflection of the laser beams and thus to prevent noise from being generated by the reflection of the laser beams emitted from the lidar device 110, a surface treatment may be performed on or a shield tape or the like may be attached to the upper surface of the drive unit 100 and the bottom surface of the body unit 200 between which the lidar device groove 210 is formed.

Figure 4:
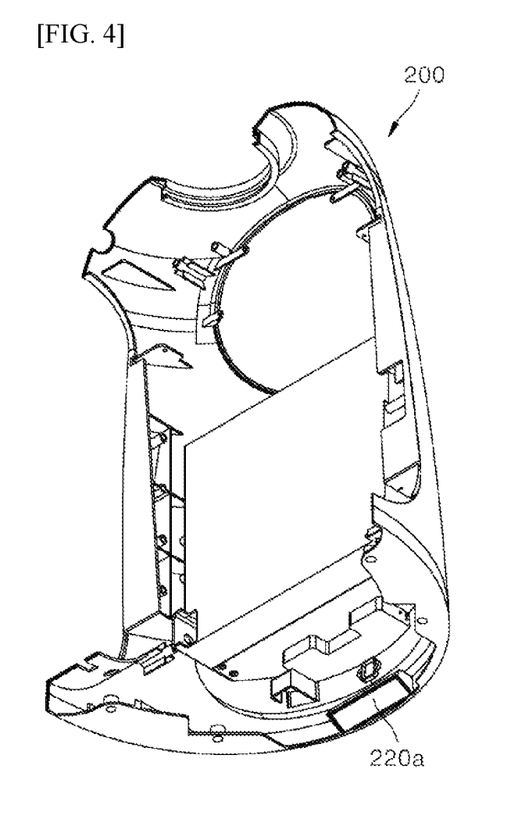
FIG. 4 is a perspective view illustrating a state in which some configurations of a body unit of the autonomous driving apparatus according to the first exemplary embodiment of the present invention are removed.
Figure 5:
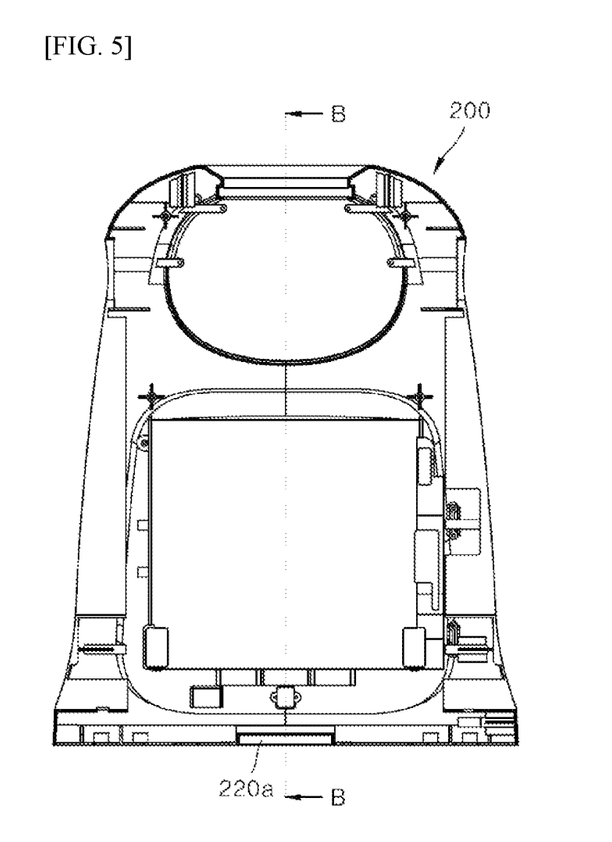
FIG. 5 is a front view illustrating a state in which some configurations of the body unit of the autonomous driving apparatus according to the first exemplary embodiment of the present invention are removed.

FIGS. 4 and 5 are a perspective view and a front view, respectively, illustrating a state in which some constituent components of the body unit according to the first exemplary embodiment of the present invention are removed.

Figure 6:
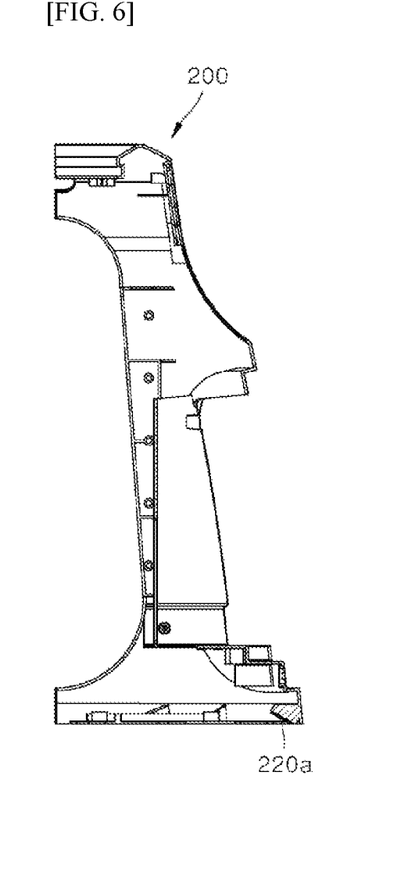
FIG. 6 is a side view of a cross section taken along line B-B' in FIG. 5.

FIG. 6 is a side view of a cross section taken along line B-B' in FIG. 5.

Referring to FIGS. 4 to 6, the mirror module 220 may be coupled to a mirror module seating portion 220a formed on the bottom surface of the body unit 200.

In addition, the mirror module seating portion 220a may be formed to be inclined to reflect, toward a detection region, the laser beams emitted from the lidar device 110.

In addition, a lower space, in which the mirror module seating portion 220a of the body unit 200 is formed, may be coupled to be spaced apart from the drive unit 100, thereby forming the lidar device groove 210.

Figure 7:
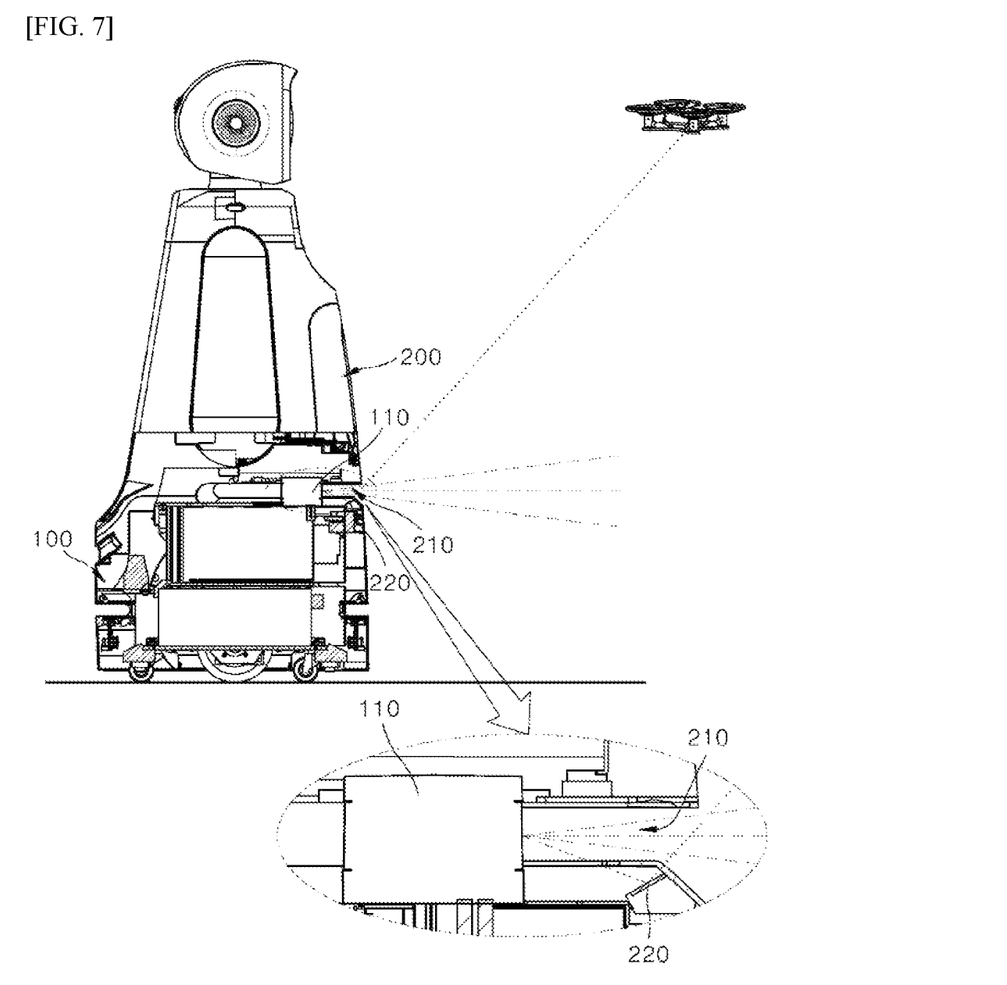
FIG. 7 is a cross-sectional side view of an autonomous driving apparatus according to a second exemplary embodiment of the present invention.

FIG. 7 is a cross-sectional side view of an autonomous driving apparatus according to a second exemplary embodiment of the present invention.

Referring to FIG. 7, the mirror module 220 is coupled in a recessed manner at an inner lower end of the lidar device groove 210.

Therefore, the mirror module 220 reflects, toward a front upper side of the lidar device 110, the laser beams emitted from the lidar device 110.

Therefore, some of the downwardly directed laser beams emitted from the lidar device 110 are reflected by the mirror module 220 and travel toward an upper side adjacent to the autonomous driving apparatus, thereby detecting an obstacle, such as a drone, which is a structure protruding into the air, or the like.

Figure 8:
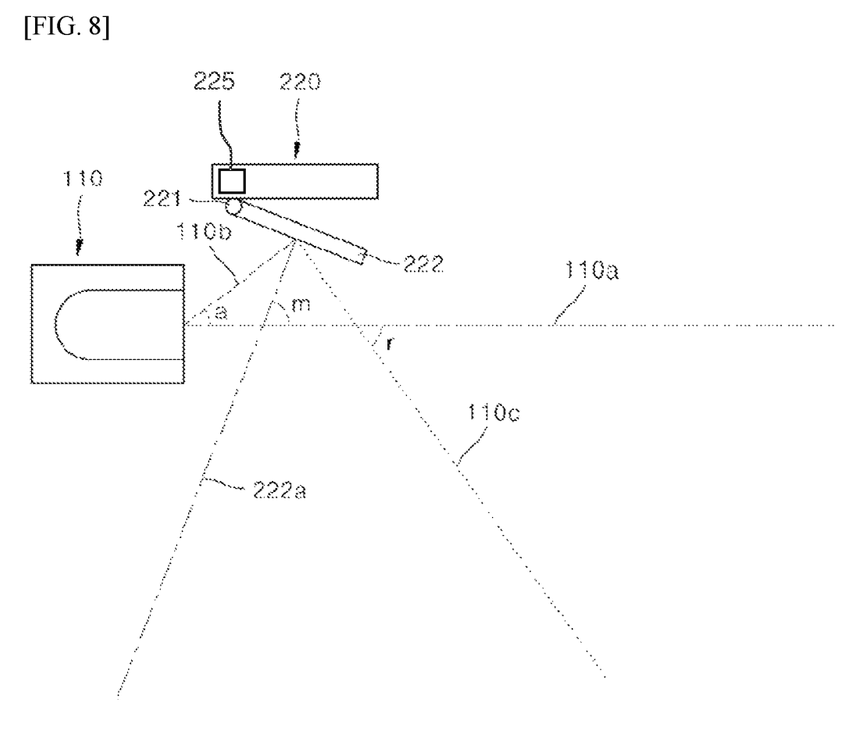
FIG. 8 is a conceptual view of a lidar device and a mirror module of an autonomous driving apparatus according to a third exemplary embodiment of the present invention.

FIG. 8 is a conceptual view of a lidar device and a mirror module according to a third exemplary embodiment of the present invention.

Referring to FIG. 8, the mirror module 220 may include a mirror panel 222 configured to rotate about a mirror panel rotating shaft 221.

Therefore, it is possible to control reflection angles of the laser beams by adjusting an angle of the mirror panel 222 even though the mirror module seating portion 220a is not formed to be inclined.

In addition, the mirror module 220 may further include a control unit (not illustrated) configured to set a gradient of the mirror panel 222, and a mirror module drive unit (not illustrated) configured to rotate the mirror panel 222.

In this case, the mirror module drive unit may be connected to the battery 130 and supplied with electric power.

Meanwhile, a method of setting, by the control unit, the gradient of the mirror panel 222 will be described below with reference to FIG. 8.

a is an acute angle formed between a horizontal laser beam 110a horizontally emitted from the lidar device 110 and an upwardly directed laser beam 110b emitted toward the mirror panel 222.

In addition, m is an acute angle formed between the horizontal laser beam 110a and a mirror panel normal line 222a which is an imaginary line.

In addition, r is an acute angle formed between the horizontal laser beam 110a and a reflected laser beam 110c made as the upwardly directed laser beam 110b is reflected by the mirror panel 222.

In this case, m, which is the acute angle formed between the horizontal laser beam 110a and the mirror panel normal line 222a, is determined by Equation $m=(180+a-r)/2$.

As an example, the gradient of the mirror panel 222 may be set such that when a is 15° and r is 43.5°, the acute angle m formed between the horizontal laser beam 110a and the mirror panel normal line 222a, which is an imaginary line, is 75.75°.

Therefore, the control unit of the mirror module 220 may minimize the calculation required to set the gradient of the mirror panel 222.

In addition, the mirror module 220 may further include a gradient sensor 225.

Therefore, even though the autonomous driving apparatus is inclined, the mirror panel 222 maintains a predetermined gradient so that the laser beams emitted from the lidar device 110 are directed toward the detection region.

Therefore, the autonomous driving apparatus according to the exemplary embodiment of the present invention may constantly detect the region to be detected even though the autonomous driving apparatus travels on an uneven road surface.

Figure 9:
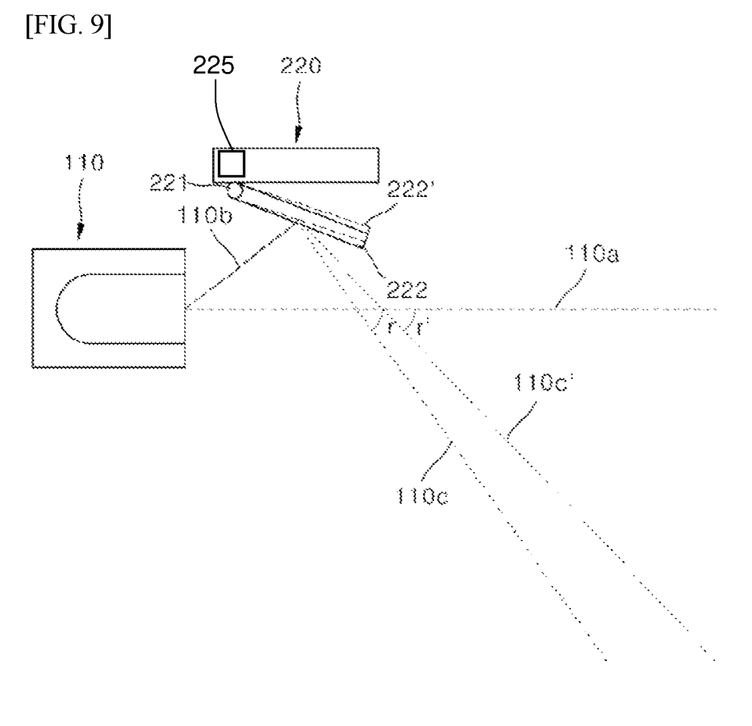
FIG. 9 is a conceptual view illustrating a change in gradient of the mirror module when the autonomous driving apparatus according to the third exemplary embodiment of the present invention travels at a high speed and at a general speed.

FIG. 9 is a conceptual view illustrating a change in gradient of the mirror module when the autonomous driving apparatus according to the third exemplary embodiment of the present invention travels at a high speed and at a general speed.

Referring to FIG. 9, the gradient of the mirror panel 222 of the mirror module 220 may be changed in accordance with a traveling speed of the drive unit 100.

More specifically, in a case in which the autonomous driving apparatus according to the exemplary embodiment of the present invention travels at a general speed, the mirror panel 222 is inclined so that the acute angle formed between the horizontal laser beam 110a and the reflected laser beam 110c becomes r.

In contrast, in a case in which the autonomous driving apparatus according to the exemplary embodiment of the present invention travels at a high speed, the mirror panel 222' is inclined so that the acute angle formed between the horizontal laser beam 110a and the reflected laser beam 110c becomes r'.

That is, the mirror panel 222 is further inclined in the horizontal direction when the drive unit 100 travels at a high speed than when the drive unit 100 travels at a general speed, such that the reflected laser beam 110c may be directed toward a point spaced apart from the drive unit 100 at a longer distance.

Therefore, the autonomous driving apparatus according to the exemplary embodiment of the present invention may form the detection region at a longer distance from the autonomous driving apparatus in consideration of a direction change or a braking distance when the autonomous driving apparatus travels at a high speed.

In addition, the gradient of the mirror panel 222 may also be changed when the detecting sensor 140 detects an obstacle but the lidar device 110 cannot detect the obstacle.

Figure 10:
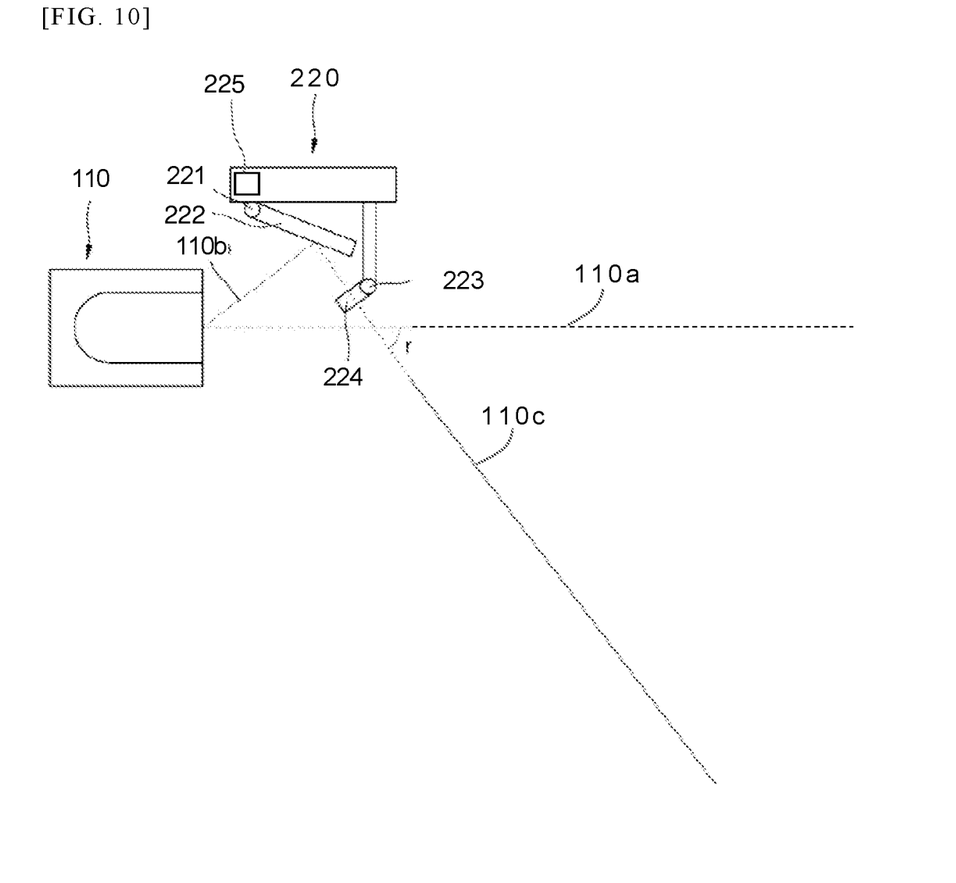
FIG. 10 is a conceptual view of a lidar device and a mirror module according to a fourth exemplary embodiment of the present invention.

FIG. 10 is a conceptual view of a lidar device and a mirror module according to a fourth exemplary embodiment of the present invention.

Referring to FIG. 10, the mirror module 220 may further include a compensation filter 224 configured to rotate about a compensation filter rotating shaft 223 so that the compensation filter 224 has a gradient set by the control unit (not illustrated).

The compensation filter 224 is a transparent interference filter.

Therefore, in a case in which the laser beams reflected by the mirror panel 222 have noise, the compensation filter 224 transmits only a laser beam having a predetermined wavelength and transfers the laser beam to the detection region.

In addition, even in a case in which the laser beams are reflected by the detection object and return to the lidar device 210 via the mirror panel 222, the compensation filter 224 may transmit only the laser beams having the predetermined wavelength.

Therefore, the lidar device 110 of the autonomous driving apparatus according to the exemplary embodiment of the present invention may further improve a detection performance by removing noise that may occur when the laser beams are reflected by the mirror panel 222 and the detection object.

In addition, as illustrated in FIG. 10, the gradient of the compensation filter 224 may be set such that a normal line, which is an imaginary line, to the compensation filter 224 coincides with the reflected laser beam 110c.

Therefore, the compensation filter 224 may further improve transmission efficiency.

Figure 11:
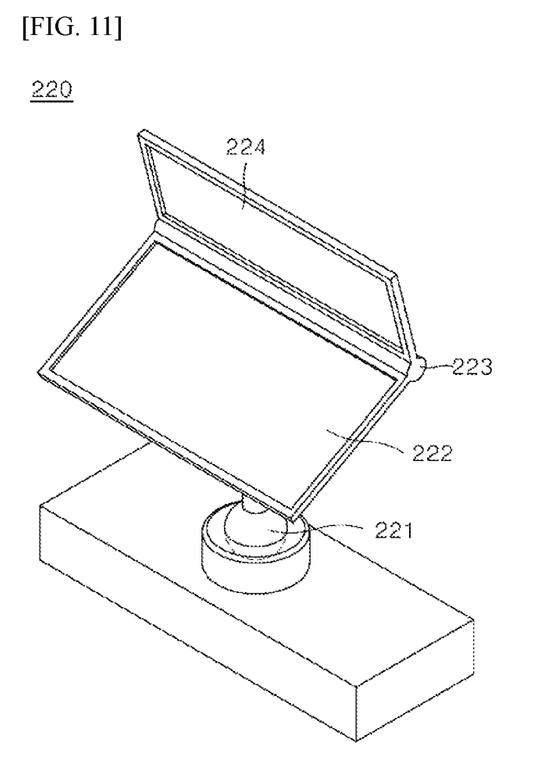
FIG. 11 is a perspective view of the mirror module according to the fourth exemplary embodiment of the present invention.

FIG. 11 is a perspective view of the mirror module according to the fourth exemplary embodiment of the present invention.

Figure 12:
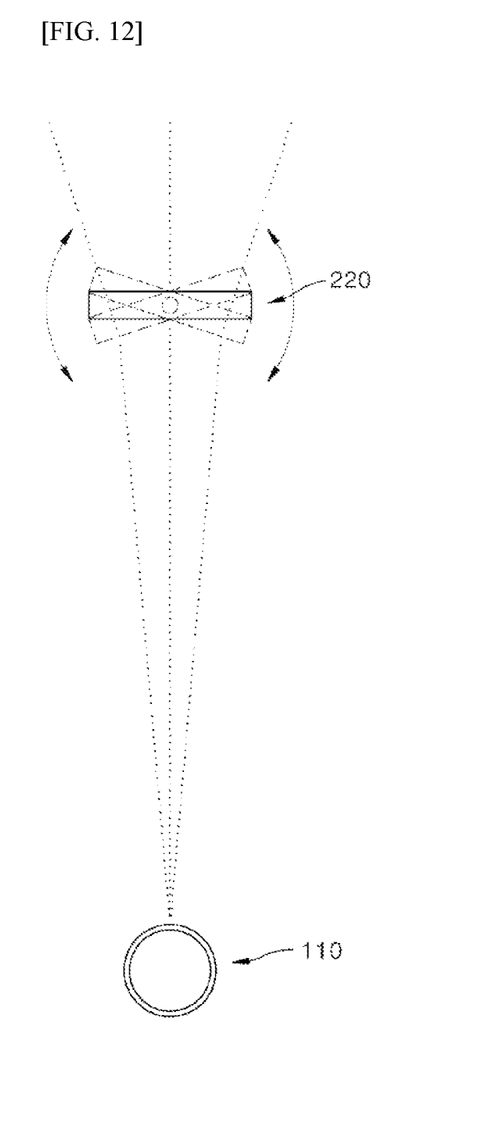
FIG. 12 is a top plan view of the lidar device and the mirror module of the autonomous driving apparatus according to the fourth exemplary embodiment of the present invention.

FIG. 12 is a top plan view of the lidar device and the mirror module of the autonomous driving apparatus according to the fourth exemplary embodiment of the present invention.

Referring to FIGS. 11 and 12, the mirror module 200 may include the mirror panel rotating shaft 221 having a spherical joint.

Therefore, the gradient of the mirror module 220 may be adjusted leftward and rightward, and as a result, the irradiation range of the lidar device 110 may be further expanded in the horizontal direction.

In addition, the mirror module 220 may further include the compensation filter 224 configured to rotate about the compensation filter rotating shaft 223 coupled at one side of the mirror panel 222.

Therefore, like the mirror panel 222, the angle of the compensation filter 224 is adjusted leftward and rightward, and as a result, the compensation filter rotating shaft 223 may be configured in a hinged manner so that the angle thereof is adjusted only upward and downward.

The invention claimed is:

1. An autonomous driving apparatus comprising:
    a drive unit configured to provide a driving function;
    a body unit coupled at an upper side of the drive unit;
    a light detection and ranging (lidar) device coupled to the drive unit;
    a lidar device groove having an opening portion formed in an irradiation direction of the lidar device, wherein the lidar device groove is located between the upper side of the drive unit and a bottom side of the body unit; and
    a mirror module coupled at an inside upper end of the lidar device groove in the irradiation direction of the lidar device and configured to reflect laser beams emitted from the lidar device toward an angled downward direction of the lidar device,
    wherein the mirror module comprises:
    a compensation filter rotating shaft; and
    a compensation filter arranged perpendicular to a direction of the laser beams reflected toward a front and lower side of the lidar device, the compensation filter configured to rotate about the compensation filter rotating shaft.

2. The autonomous driving apparatus of claim 1, wherein the mirror module is coupled to the bottom side of the body unit in a recessed manner so as not to protrude.

3. The autonomous driving apparatus of claim 1, wherein the mirror module is coupled to the upper side of the drive unit in a recessed manner so as not to protrude and configured to reflect laser beams emitted from the lidar device toward an angled upward direction of the lidar device.

4. The autonomous driving apparatus of claim 1, further comprising shield tapes provided on an upper side and a bottom side of the lidar device groove.

5. The autonomous driving apparatus of claim 1, wherein the mirror module comprises a mirror panel configured to rotate about a mirror panel rotating shaft.

6. The autonomous driving apparatus of claim 5, wherein the mirror module comprises a control unit configured to set a gradient of the mirror panel, and a mirror module drive unit configured to rotate the mirror panel.

7. The autonomous driving apparatus of claim 6, wherein the mirror panel rotates based on using a hinge.

8. The autonomous driving apparatus of claim 6, wherein the control unit is further configured to maintain a predetermined gradient of the mirror panel based on a gradient sensor.

9. The autonomous driving apparatus of claim 6, wherein the gradient of the mirror panel is changed in accordance with a traveling speed of the autonomous driving apparatus.

10. The autonomous driving apparatus of claim 6, wherein the compensation filter has a gradient set by the control unit.

11. The autonomous driving apparatus of claim 6, wherein the mirror panel rotates based on using a spherical joint.

12. The autonomous driving apparatus of claim 11, wherein the compensation filter rotating shaft is coupled at one side of the mirror panel.

13. The autonomous driving apparatus of claim 12, wherein the compensation filter transmits a laser beam having a predetermined wavelength.

14. The autonomous driving apparatus of claim 1, wherein the drive unit further comprises a pair of wheels and a motor configured to be powered by a battery.

15. The autonomous driving apparatus of claim 14, wherein the drive unit further comprises one or more detecting sensors configured to detect an obstacle.

16. The autonomous driving apparatus of claim 15, wherein the one or more detecting sensors is an ultrasonic sensor.

* * * * *